(12) United States Patent
Wang

(10) Patent No.: US 12,089,688 B2
(45) Date of Patent: Sep. 17, 2024

(54) MATERIAL PICKUP MECHANISM FOR AUTOMATIC HAT-MAKING PRODUCTION LINE EQUIPMENT

(71) Applicant: QINGDAO QIANFENG CAPART INT'L CORP, Qingdao (CN)

(72) Inventor: Aimei Wang, Qingdao (CN)

(73) Assignee: QINGDAO QIANFENG CAPART INT'L CORP, Qingdao (CN)

( * ) Notice: Subject to any disclaimer, the term of this patent is extended or adjusted under 35 U.S.C. 154(b) by 36 days.

(21) Appl. No.: 18/009,977

(22) PCT Filed: Mar. 23, 2022

(86) PCT No.: PCT/CN2022/082563
§ 371 (c)(1),
(2) Date: Dec. 12, 2022

(87) PCT Pub. No.: WO2022/222676
PCT Pub. Date: Oct. 27, 2022

(65) Prior Publication Data
US 2023/0225447 A1    Jul. 20, 2023

(30) Foreign Application Priority Data

Apr. 23, 2021    (CN) .......................... 202110439605.0

(51) Int. Cl.
*A42C 1/00*    (2006.01)
*A42C 3/00*    (2006.01)

(52) U.S. Cl.
CPC .................. *A42C 1/00* (2013.01); *A42C 3/00* (2013.01); *B65H 2404/5391* (2013.01)

(58) Field of Classification Search
CPC .... A42C 1/00; A42C 3/00; B65H 2404/5391; B25J 15/0061; B25J 15/0616
See application file for complete search history.

(56) References Cited

U.S. PATENT DOCUMENTS 8,172,288 B2 * 5/2012 Jonas ................... B25J 15/0616
                                                            294/907
8,714,609 B2 * 5/2014 Sydorko ............. H01L 21/6838
                                                            294/64.3

(Continued)

FOREIGN PATENT DOCUMENTS

CN       106044304 A       10/2016
CN       208120323 U   *   11/2018

(Continued)

*Primary Examiner* — Shaun R Hurley
(74) *Attorney, Agent, or Firm* — Bayramoglu Law Offices LLC

(57) ABSTRACT

A material pickup mechanism for automatic hat-making production line equipment includes an installation seat, a servo motor, and a rotating seat. A control box is arranged on one side of the installation seat through bolts. The servo motor is arranged at a bottom end of the installation seat through a positioning plate and positioning screw. The rotating seat is arranged at an output shaft of the servo motor through bolts. Top and bottom ends of the rotating seat are both connected with an installation plate through a fixed shaft. Adjusting holes are formed at a top of the installation plate. A hollow screw penetrates the adjusting hole. A bottom of the hollow screw is connected with an air outlet end of at least one sucking disc. The material pickup mechanism can continuously pick up materials to improve production efficiency. It is convenient to adjust positions between sucking discs.

8 Claims, 2 Drawing Sheets

(56) References Cited

U.S. PATENT DOCUMENTS

| | | | |
|---|---|---|---|
| 10,926,403 B1* | 2/2021 | Asokan | B25J 15/0052 |
| 2003/0001328 A1 | 1/2003 | Hall et al. | |
| 2010/0171331 A1* | 7/2010 | Jonas | H01L 21/67259 |
| | | | 294/64.3 |
| 2013/0302126 A1* | 11/2013 | Schaller | B25J 9/10 |
| | | | 414/737 |
| 2019/0351563 A1* | 11/2019 | Bando | B65B 5/06 |
| 2020/0262069 A1* | 8/2020 | Douglas | B65G 47/918 |
| 2021/0078170 A1* | 3/2021 | Jiang | B25J 15/0616 |
| 2021/0085035 A1* | 3/2021 | Cross | A43D 25/20 |
| 2021/0086372 A1* | 3/2021 | Wellman | B25J 15/12 |

FOREIGN PATENT DOCUMENTS

| | | | |
|---|---|---|---|
| CN | 208561062 U | | 3/2019 |
| CN | 210012375 U | | 2/2020 |
| CN | 210365957 U | * | 4/2020 |
| CN | 112938557 A | | 6/2021 |

* cited by examiner

MATERIAL PICKUP MECHANISM FOR AUTOMATIC HAT-MAKING PRODUCTION LINE EQUIPMENT

CROSS REFERENCE TO THE RELATED APPLICATIONS

This application is the national phase entry of International Application No. PCT/CN2022/082563, filed on Mar. 23, 2022, which is based upon and claims priority to Chinese Patent Application No. 202110439605.0, filed on Apr. 23, 2021, the entire contents of which are incorporated herein by reference.

TECHNICAL FIELD

The present disclosure relates to the technical field of material pickup mechanisms, and in particular, to a material pickup mechanism for automatic hat-making production line equipment.

BACKGROUND

Hats are a kind of clothing worn on the head, most of which can cover the entire top of the head and are mainly used to protect the head. Some hats have protruding edges to prevent from the sunshine. Hats can also be used to dress up, as well as protect hairstyles and cover baldness. Hats can be of different types, such as berets, and flat caps. Wearing a hat has different cultures in different regions, which is especially important in Western cultures, because wearing a hat was a symbol of social status in the past. In the prior art, materials need to be picked up by a material pickup mechanism on automatic production line equipment during hat production, and there is a lack of automatic and fast special equipment capable of picking up the materials. In addition, the prior material pickup mechanism has low work efficiency and is inconvenient to operate.

The prior material pickup mechanism on automatic hat-making production line equipment has the following shortcomings: 1, the material pickup mechanism on automatic hat-making production line equipment cannot continuously pick up the materials to improve production efficiency; 2, it is inconvenient to adjust positions between sucking discs, and adsorb and fix different sizes of cloth; and 3, it is inconvenient for remote control. Therefore, a material pickup mechanism for automatic hat-making production line equipment is provided.

SUMMARY

An objective of the present disclosure is to provide a material pickup mechanism for automatic hat-making production line equipment to solve problems in the background art.

To achieve the above objective, the technical solution adopted by the present disclosure is:

A material pickup mechanism for automatic hat-making production line equipment includes a power protector, an installation seat, a servo motor, and a rotating seat. A control box is arranged on one side of the installation seat through bolts. The servo motor is arranged at a bottom end of the installation seat through a positioning plate and positioning screw. The rotating seat is arranged at an output shaft of the servo motor through bolts. Top and bottom ends of the rotating seat are both connected with an installation plate through a fixed shaft. Adjusting holes are formed at a top of the installation plate. A hollow screw penetrates the adjusting hole. A bottom of the hollow screw is connected with an air outlet end of at least one sucking disc.

Further, an uninterruptible power supply (UPS) may be arranged on one side of an inner wall of the control box through screw. The power protector may be arranged at a lower end of the UPS through bolts. A programmable logic controller (PLC) may be arranged at a lower end of the power protector through a clamping groove. Output and input terminals of the PLC may be respectively connected with an input terminal of the servo motor and an output terminal of the UPS through wires. The PLC controller is used to automatically control a rotation angle and speed of the servo motor, thereby driving the rotating seat to rotate. After the first piece of cloth is sucked, the rotating seat drives the installation plate to rotate through the servo motor, and after rotating in place, the second piece of cloth is sucked to complete suction of the two pieces of cloth.

Further, the hollow screw may be fixed in the adjusting hole through a clamping nut, and a connecting sleeve may be arranged at a top of the hollow screw.

Further, a bottom of the at least one sucking disc may be adhered with an arc adsorption plate through a polyurethane adhesive, and an air intake hole may be formed at a center of the arc adsorption plate. Using the arc adsorption plate, the adhesion is high, and the material pickup effect is improved.

Further, the at least one sucking disc at a bottom of the installation plate comprises four sucking discs.

Further, an output terminal of the power protector may be connected with an input terminal of a UPS through a wire. The power protector integrates three-phase voltage display, overvoltage protection, undervoltage protection, phase loss protection, and phase sequence protection, which has the characteristics of complete functions, stable performance, and simple operation, and has a good protective effect on the UPS.

Further, a wireless switch may be arranged on the other side of an inner wall of the control box through screw, and the wireless switch may be connected with the servo motor through a wire.

Further, a waterproof layer may be arranged on an inner surface layer of the control box, and the waterproof layer may be a polytetrafluoroethylene (PTFE) coating, such that the waterproof effect in the control box is effective at preventing moisture from entering the control box and damaging internal electronic elements.

Compared with the prior art, the present disclosure has the following beneficial effects:

1. The material pickup mechanism for automatic hat-making production line equipment of the present disclosure uses the connecting sleeve to connect a suction hose of an external vacuum pump body. When the vacuum pump body is working, a negative pressure state is generated in a sucking disc, and through the four sucking discs at the bottom of the installation plate, the hat-making cloth is quickly adsorbed and fixed. The PLC controller is used to automatically control the rotation angle and speed of the servo motor, thereby driving the rotating seat to rotate. After the first piece of cloth is sucked, the rotating seat drives the installation plate to rotate through the servo motor, and after rotating in place, the second piece of cloth is sucked to complete suction of the two pieces of cloth, such that the material pickup is completed automatically, which improves the production efficiency of the automatic hat-making production line.

2. According to the material pickup mechanism for automatic hat-making production line equipment of the present disclosure, the clamping nut on the hollow screw is unscrewed to adjust a position of the hollow screw in the adjusting hole to adjust relative positions of the four sucking discs, control an adsorption range, and realize adsorption and fixation of different sizes of hat-making cloth. The wireless switch is used to connect external smartphone to remotely control opening and closing of the servo motor, which is highly intelligent and easy to operate.

3. According to the material pickup mechanism for automatic hat-making production line equipment of the present disclosure, the power protector integrates three-phase voltage display, overvoltage protection, undervoltage protection, phase loss protection, and phase sequence protection, which has the characteristics of complete functions, stable performance, and simple operation, and has a good protective effect on the UPS.

Figure 1:
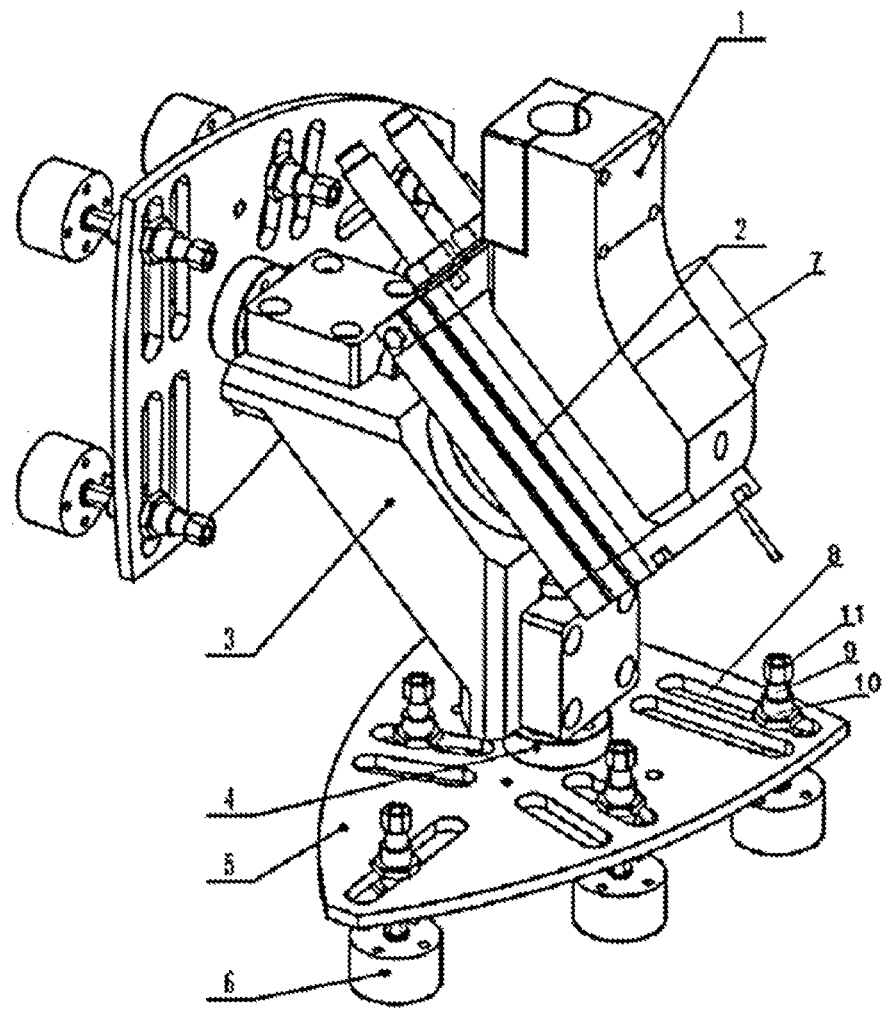
FIG. 1 is a schematic diagram of an overall structure of a material pickup mechanism for automatic hat-making production line equipment of the present disclosure.

Reference numerals: 1, an installation seat; 2, a servo motor; 3, a rotating seat; 4, a fixed shaft; 5, an installation plate; 6, a sucking disc; 7, a control box; 8, an adjusting hole; 9, a hollow screw; 10, a clamping nut; 11, a connecting sleeve; 12, an air intake hole; 13, an arc adsorption plate; 14, a wireless switch: 15, a UPS; 16, a power protector; and 17, a PLC.

DETAILED DESCRIPTION OF THE EMBODIMENTS

In order to make the technical means, creative features, objectives to be achieved, and efficacy achieved by the present disclosure easy to understand, the disclosure will be further described below in combination with specific embodiments.

Embodiment I

Figure 2:
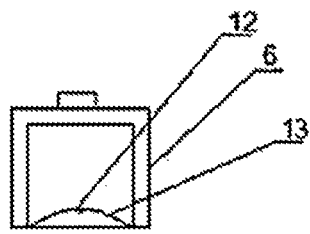
FIG. 2 is a cross-sectional view of a sucking disc of the material pickup mechanism for automatic hat-making production line equipment of the present disclosure.
Figure 3:
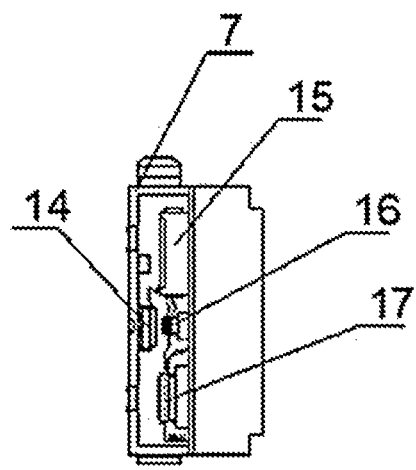
FIG. 3 is a cross-sectional view of a control box of the material pickup mechanism for automatic hat-making production line equipment of the present disclosure.

As shown in FIG. 1 to FIG. 3, a material pickup mechanism for automatic hat-making production line equipment includes a power protector 16, an installation seat 1, a servo motor 2, and a rotating seat 3. A control box 7 is arranged on one side of the installation seat 1 through bolts. The servo motor 2 is arranged at a bottom end of the installation seat 1 through a positioning plate and positioning screw. The rotating seat 3 is arranged at an output shaft of the servo motor 2 through bolts. Top and bottom ends of the rotating seat 3 are both connected with an installation plate 5 through a fixed shaft 4. Adjusting holes 8 are formed at a top of the installation plate 5. A hollow screw 9 penetrates the adjusting hole 8. A bottom of the hollow screw 9 is connected with an air outlet end of at least one sucking disc 6.

A UPS 15 is arranged on one side of an inner wall of the control box 7 through screw. The power protector 16 is arranged at a lower end of the UPS 15 through bolts. A PLC 17 is arranged at a lower end of the power protector 16 through a clamping groove. Output and input terminals of the PLC 17 are respectively connected with an input terminal of the servo motor 2 and an output terminal of the UPS 15 through wires.

In the present embodiment, as shown in FIG. 3, the PLC controller 17 is used to automatically control a rotation angle and speed of the servo motor 2, thereby driving the rotating seat 3 to rotate. After the first piece of cloth is sucked, the rotating seat 3 drives the installation plate 5 to rotate through the servo motor 2, and after rotating in place, the second piece of cloth is sucked to complete suction of the two pieces of cloth.

The hollow screw 9 is fixed in the adjusting hole 8 through a clamping nut 10, and a connecting sleeve 11 is arranged at a top of the hollow screw 9.

In the present embodiment, as shown in FIG. 1, the clamping nut 10 on the hollow screw 9 is unscrewed to adjust a position of the hollow screw 9 in the adjusting hole 8 to adjust relative positions of the four groups of sucking discs 6, control an adsorption range, and realize adsorption and fixation of different sizes of hat-making cloth.

A bottom of the at least one sucking disc 6 is adhered with an arc adsorption plate 13 through a polyurethane adhesive, and an air intake hole 12 is formed at a center of the arc adsorption plate 13.

In the present embodiment, as shown in FIG. 2, using the arc adsorption plate 13, the adhesion is high, and the material pickup effect is improved.

The at least one sucking disc 6 at a bottom of the installation plate 5 comprises four sucking discs.

An output terminal of the power protector 16 is connected with an input terminal of a UPS 15 through a wire.

In the present embodiment, as shown in FIG. 3, the power protector 16 integrates three-phase voltage display, overvoltage protection, undervoltage protection, phase loss protection, and phase sequence protection, which has the characteristics of complete functions, stable performance, and simple operation, and has a good protective effect on the UPS 15.

A wireless switch 14 is arranged on the other side of an inner wall of the control box 7 through screw, and the wireless switch 14 is connected with the servo motor 2 through a wire.

In the present embodiment, as shown in FIG. 3, the wireless switch 14 is used to connect external smartphone to remotely control opening and closing of the servo motor 2, which is highly intelligent and easy to operate.

A waterproof layer is arranged on an inner surface layer of the control box 7, and the waterproof layer is a PTFE coating.

In the present embodiment, as shown in FIG. 1, the waterproof layer is the PTFE coating, such that the waterproof effect in the control box 7 is effective at preventing moisture from entering the control box 7 and damaging internal electronic elements.

Embodiment II

As shown in FIG. 1 to FIG. 3, a material pickup mechanism for automatic hat-making production line equipment includes a power protector 16, an installation seat 1, a servo motor 2, and a rotating seat 3. A control box 7 is arranged on one side of the installation seat 1 through bolts. The servo motor 2 is arranged at a bottom end of the installation seat 1 through a positioning plate and positioning screw. The rotating seat 3 is arranged at an output shaft of the servo motor 2 through bolts. Top and bottom ends of the rotating seat 3 are both connected with an installation plate 5 through a fixed shaft 4. Adjusting holes 8 are formed at a top of the installation plate 5. A hollow screw 9 penetrates the adjusting hole 8. A bottom of the hollow screw 9 is connected with an air outlet end of at least one sucking disc 6.

A UPS 15 is arranged on one side of an inner wall of the control box 7 through screw. The power protector 16 is arranged at a lower end of the UPS 15 through bolts. A PLC 17 is arranged at a lower end of the power protector 16 through a clamping groove. Output and input terminals of the PLC 17 are respectively connected with an input terminal of the servo motor 2 and an output terminal of the UPS 15 through wires.

In the present embodiment, as shown in FIG. 3, the PLC controller 17 is used to automatically control a rotation angle and speed of the servo motor 2, thereby driving the rotating seat 3 to rotate. After the first piece of cloth is sucked, the rotating seat 3 drives the installation plate 5 to rotate through the servo motor 2, and after rotating in place, the second piece of cloth is sucked to complete suction of the two pieces of cloth.

The hollow screw 9 is fixed in the adjusting hole 8 through a clamping nut 10, and a connecting sleeve 11 is arranged at a top of the hollow screw 9.

In the present embodiment, as shown in FIG. 1, the clamping nut 10 on the hollow screw 9 is unscrewed to adjust a position of the hollow screw 9 in the adjusting hole 8 to adjust relative positions of the four sucking discs 6, control an adsorption range, and realize adsorption and fixation of different sizes of hat-making cloth.

A bottom of the at least one sucking disc 6 is adhered with an arc adsorption plate 13 through a polyurethane adhesive, and an air intake hole 12 is formed at a center of the arc adsorption plate 13.

In the present embodiment, as shown in FIG. 2, using the arc adsorption plate 13, the adhesion is high, and the material pickup effect is improved.

The at least one sucking disc 6 at a bottom of the installation plate 5 comprises four sucking discs.

An output terminal of the power protector 16 is connected with an input terminal of a UPS 15 through a wire.

In the present embodiment, as shown in FIG. 3, the power protector 16 integrates three-phase voltage display, overvoltage protection, undervoltage protection, phase loss protection, and phase sequence protection, which has the characteristics of complete functions, stable performance, and simple operation, and has a good protective effect on the UPS 15.

A wireless switch 14 is arranged on the other side of an inner wall of the control box 7 through screw, and the wireless switch 14 is connected with the servo motor 2 through a wire.

In the present embodiment, as shown in FIG. 3, the wireless switch 14 is used to connect external smartphone to remotely control opening and closing of the servo motor 2, which is highly intelligent and easy to operate.

A waterproof layer is arranged on an inner surface layer of the control box 7, and the waterproof layer is a silicone coating.

In the present embodiment, as shown in FIG. 1, the waterproof layer is the silicone coating, such that the waterproof effect in the control box 7 is effective at preventing moisture from entering the control box 7 and damaging internal electronic elements.

It should be noted that the material pickup mechanism for automatic hat-making production line equipment of the present disclosure uses the connecting sleeve 11 to connect a suction hose of an external vacuum pump body during working. When the vacuum pump body is working, a negative pressure state is generated in the at least one sucking disc 6, and through the four sucking discs 6 at the bottom of the installation plate 5, the hat-making cloth is quickly adsorbed and fixed. The PLC controller 17 is used to automatically control the rotation angle and speed of the servo motor 2, thereby driving the rotating seat 3 to rotate. After the first piece of cloth is sucked, the rotating seat 3 drives the installation plate 5 to rotate through the servo motor 2, and after rotating in place, the second piece of cloth is sucked to complete suction of the two pieces of cloth, such that the material pickup is completed automatically, which improves the production efficiency of the automatic hat-making production line. The clamping nut 10 on the hollow screw 9 is unscrewed to adjust a position of the hollow screw 9 in the adjusting hole 8 to adjust relative positions of the four sucking discs 6, control an adsorption range, and realize adsorption and fixation of different sizes of hat-making cloth. The wireless switch 14 is used to connect external smartphone to remotely control opening and closing of the servo motor 2, which is highly intelligent and easy to operate. The power protector 16 integrates three-phase voltage display, overvoltage protection, undervoltage protection, phase loss protection, and phase sequence protection, which has the characteristics of complete functions, stable performance, and simple operation, and has a good protective effect on the UPS 15.

The above display and describe the basic principles, main features and advantages of the present disclosure. It should be understood by a person skilled in the art that the present disclosure is not limited by the aforementioned embodiments. The aforementioned embodiments and the description only illustrate the principles of the present disclosure. Various changes and modifications may be made to the present disclosure without departing from the spirit and scope of the present disclosure. Such changes and modifications all fall within the claimed scope of the present disclosure. The protection scope of the present disclosure is defined by the appended claims and equivalents thereof.

What is claimed is:

1. A material pickup mechanism for automatic hat-making production line equipment, comprising a power protector, an installation seat, a servo motor, and a rotating seat, wherein a control box is arranged on one side of the installation seat through first bolts, the servo motor is arranged at a bottom end of the installation seat through a positioning plate and a positioning screw, the rotating seat is arranged at an output shaft of the servo motor through second bolts, a top end of the rotating seat and a bottom end of the rotating seat are both connected with an installation plate through a fixed shaft, adjusting holes are formed at a top of the installation plate, a hollow screw penetrates one adjusting hole of the adjusting holes, and a bottom of the hollow screw is connected with an air outlet end of at least one sucking disc.

2. The material pickup mechanism according to claim 1, wherein an uninterruptible power supply (UPS) is arranged on a first side of an inner wall of the control box through a first screw, the power protector is arranged at a lower end of the UPS through third bolts, a programmable logic controller (PLC) is arranged at a lower end of the power protector through a clamping groove, and an output terminal of the PLC and an input terminal of the PLC are respectively connected with an input terminal of the servo motor and an output terminal of the UPS through first wires.

3. The material pickup mechanism according to claim 2, wherein a wireless switch is arranged on a second side of the inner wall of the control box through a second screw, and the wireless switch is connected with the servo motor through a second wire.

4. The material pickup mechanism according to claim 1, wherein the hollow screw is fixed in the one adjusting hole through a clamping nut, and a connecting sleeve is arranged at a top of the hollow screw.

5. The material pickup mechanism according to claim 1, wherein a bottom of the at least one sucking disc is adhered with an arc adsorption plate through a polyurethane adhesive, and an air intake hole is formed at a center of the arc adsorption plate.

6. The material pickup mechanism according to claim 1, wherein the at least one sucking disc at a bottom of the installation plate comprises four sucking discs.

7. The material pickup mechanism according to claim 1, wherein an output terminal of the power protector is connected with an input terminal of a UPS through a wire.

8. The material pickup mechanism according to claim 1, wherein a waterproof layer is arranged on an inner surface layer of the control box, and the waterproof layer is a polytetrafluoroethylene (PTFE) coating.

* * * * *